United States Patent
Sun et al.

(10) Patent No.: US 10,175,721 B2
(45) Date of Patent: Jan. 8, 2019

(54) PORTABLE ELECTRONIC APPARATUS AND OPERATION METHOD OF PORTABLE ELECTRONIC APPARATUS

(71) Applicants: Ching-Wen Sun, Taipei (TW); Wei-Han Hu, Taipei (TW); Wen-Yi Chiu, Taipei (TW); Kun-Hsuan Chang, Taipei (TW); Ting-Wei Wu, Taipei (TW); Chiao-Tsu Chiang, Taipei (TW); Hui-Fang Huang, Taipei (TW); Hsin-Chieh Cheng, Taipei (TW)

(72) Inventors: Ching-Wen Sun, Taipei (TW); Wei-Han Hu, Taipei (TW); Wen-Yi Chiu, Taipei (TW); Kun-Hsuan Chang, Taipei (TW); Ting-Wei Wu, Taipei (TW); Chiao-Tsu Chiang, Taipei (TW); Hui-Fang Huang, Taipei (TW); Hsin-Chieh Cheng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 85 days.

(21) Appl. No.: 15/169,759

(22) Filed: Jun. 1, 2016

(65) Prior Publication Data
US 2016/0349927 A1 Dec. 1, 2016

Related U.S. Application Data

(60) Provisional application No. 62/168,922, filed on Jun. 1, 2015.

(51) Int. Cl.
*G06F 1/16* (2006.01)
*G06F 3/01* (2006.01)
(Continued)

(52) U.S. Cl.
CPC .......... *G06F 1/1632* (2013.01); *G06F 1/1618* (2013.01); *G06F 1/1669* (2013.01);
(Continued)

(58) Field of Classification Search
CPC ...................................... G06F 1/1632
See application file for complete search history.

(56) References Cited

U.S. PATENT DOCUMENTS

2012/0105482 A1 5/2012 Xu
2014/0043259 A1* 2/2014 Park ............... G06F 3/0412
345/173
(Continued)

FOREIGN PATENT DOCUMENTS

TW 201220024 5/2012
TW 201415295 4/2014

OTHER PUBLICATIONS

"Office Action of Taiwan Counterpart Application," dated Nov. 10, 2017, p. 1-p. 7.

*Primary Examiner* — Duane N Taylor, Jr.
(74) *Attorney, Agent, or Firm* — JCIPRNET (57) ABSTRACT

A portable electronic apparatus and an operation method of the portable electronic apparatus are provided. The operation method includes: sensing an angle of a cover relative to a base. The operation method often includes sensing a posture of the cover. In the operation method, a virtual operating function of an optical sensor is enabled based on the angle and the posture.

21 Claims, 8 Drawing Sheets

(51) Int. Cl.
*G06F 3/042* (2006.01)
*G06F 3/0484* (2013.01)
*G06F 3/0485* (2013.01)

(52) U.S. Cl.
CPC .......... *G06F 1/1673* (2013.01); *G06F 1/1677* (2013.01); *G06F 3/017* (2013.01); *G06F 3/0426* (2013.01); *G06F 3/0485* (2013.01); *G06F 3/04845* (2013.01)

(56) References Cited

U.S. PATENT DOCUMENTS

| | | | | |
|---|---|---|---|---|
| 2015/0130725 | A1* | 5/2015 | Knepper | G06F 1/1643 345/173 |
| 2015/0212647 | A1* | 7/2015 | Kim | G02B 27/017 345/173 |
| 2015/0234545 | A1* | 8/2015 | Churchill | G06F 3/0482 715/767 |
| 2015/0324002 | A1* | 11/2015 | Quiet | A63F 13/24 463/31 |

* cited by examiner

PORTABLE ELECTRONIC APPARATUS AND OPERATION METHOD OF PORTABLE ELECTRONIC APPARATUS

CROSS-REFERENCE TO RELATED APPLICATION

This application claims the priority benefits of U.S. provisional application Ser. No. 62/168,922, filed on Jun. 1, 2015. The entirety of the above-mentioned patent application is hereby incorporated by reference herein and made a part of this specification.

FIELD OF INVENTION

The invention relates to a method of operating an electronic apparatus; more particularly, the invention relates to a portable electronic apparatus with a cover and a base and an operation method thereof.

DESCRIPTION OF RELATED ART

Notebook computers have the same functions as those of the common desktop computers and have the compact design that ensures portability, the notebook computers have become indispensable for some users. As the price of the notebook computers falls constantly, more and more users directly replace their desktop computers with the notebook computers. In general, the notebook computer is constituted by a base and a screen. In order to diversify the operations and usage of the notebook computers and satisfy consumers' demands, most notebook computers can support the screen-flipping function, i.e., the screen can be flipped over to the back, such that users behind the notebook computers are allowed to watch the screen.

SUMMARY OF THE INVENTION

In an embodiment of the invention, a portable electronic apparatus and an operation method of the portable electronic apparatus are provided. In the portable electronic apparatus, a cover and a base can be rotated relatively, such that a user is able to operate a display unit to display contents in an intuitive and easy manner.

In an embodiment of the invention, a portable electronic apparatus includes a pivoting element, a base, a cover, an angle sensor, a gravity sensor, an optical sensor, and a processing unit. The cover includes a display unit and is pivoted to the base through the pivoting element, such that the cover and the base are rotated relatively. The angle sensor is arranged on the pivoting element and configured to sense an angle of the cover relative to the base. The gravity sensor is arranged on the cover and configured to sense a posture of the cover. The processing unit is coupled to the angle sensor, the gravity sensor, the optical sensor, and the display unit. The processing unit enables a virtual operating function of an optical sensor based on the angle and the posture.

In an embodiment of the invention, an operation method of a portable electronic apparatus is applicable to the aforesaid portable electronic apparatus. The operation method includes: sensing an angle of the cover relative to the base and sensing a posture of the cover. The operation method often includes: enabling a virtual operating function of an optical sensor based on the angle and the posture.

According to an embodiment of the invention, the step of sensing the angle of the cover relative to the base includes: sensing the angle included between the base and a surface of the cover where the display unit is located.

According to an embodiment of the invention, after sensing the angle of the cover relative to the base, the optical sensor is enabled if the angle is greater than a predetermined value, and the optical sensor is disabled if the angle is less than or equal to the predetermined value.

According to an embodiment of the invention, if the posture of the cover is an upside-down posture, a first side of the cover pivoted to the base is located above a second side of the cover parallel to the first side. If the posture of the cover is an upright posture, said first side is located below said second side.

According to an embodiment of the invention, the step of enabling the virtual operating function of the optical sensor based on the angle and the posture includes: if the angle is greater than a predetermined value, and if the posture of the cover is the upside-down posture, enabling an air gesture function of the optical sensor, wherein the optical sensor is arranged on the pivoting element; sensing a gesture operation through the optical sensor during a period of enabling the air gesture function, so as to control contents displayed by the display unit.

According to an embodiment of the invention, the step of sensing the gesture operation through the optical sensor during the period of enabling the air gesture function to control the contents displayed by the display unit includes: detecting a first amount of movement of the gesture operation along a horizontal axis and a second amount of movement of the gesture operation along a vertical axis; determining whether the first amount of movement is greater than the second amount of movement; if the first amount of movement is greater than the second amount of movement, performing a switching function of an application program based on a direction of movement of the gesture operation along the horizontal axis; if the first amount of movement is less than or equal to the second amount of movement, determining whether to start or end a playing function of the application program based on a direction of movement of the gesture operation along the vertical axis.

According to an embodiment of the invention, the step of sensing the gesture operation through the optical sensor during the period of enabling the air gesture function to control the contents displayed by the display unit includes: detecting a first amount of movement of the gesture operation along a horizontal axis; determining whether the first amount of movement is greater than a first threshold; if the first amount of movement is greater than the first threshold, performing a switching function of an application program based on a direction of movement of the gesture operation along the horizontal axis; if the first amount of movement is less than or equal to the first threshold, determining whether to start or end a playing function of the application program based on the direction of movement of the gesture operation along a vertical axis.

According to an embodiment of the invention, the step of sensing the gesture operation through the optical sensor during the period of enabling the air gesture function to control the contents displayed by the display unit includes: detecting a first amount of movement of the gesture operation along a horizontal axis and a second amount of movement of the gesture operation along a vertical axis; determining whether the second amount of movement is greater than a second threshold; if the second amount of movement is greater than the second threshold, performing a scrolling-up-and-browsing function or a scrolling-down-and-browsing function of an application program based on a direction of movement of the gesture operation along the vertical axis; if the second amount of movement is less than or equal to the second threshold, determining whether the first amount of movement is greater than a first threshold; if the first amount of movement is greater than the first threshold, starting or ending a playing function of the application program.

According to an embodiment of the invention, during the period of enabling the air gesture function, the operation method further includes a step of determining whether a currently executed application program supports a full screen mode. If the application program supports the full screen mode, the application program is displayed in the full screen mode.

According to an embodiment of the invention, the step of enabling the virtual operating function of the optical sensor based on the angle and the posture includes: a virtual touch function of the optical sensor is enabled if the angle is greater than a predetermined value, and if the posture of the cover is an upright posture; a touch operation is sensed through the optical sensor during a period of enabling the virtual touch function, so as to control contents displayed by the portable electronic apparatus.

According to an embodiment of the invention, during the period of enabling the virtual touch function to control the contents displayed by the portable electronic apparatus, the step of sensing the touch operation through the optical sensor includes: sensing the number of touch points in the touch operation; if the number of the touch points is greater than or equal to 2, determining the touch operation is a gesture operation of an operating system; if the number of the touch points is equal to 1, determining whether or not a clicking operation is detected in a tool area within a sensing range, wherein the sensing range further includes a touch panel area; if the clicking operation is detected in the tool area, activating a corresponding tool function; if no clicking operation is detected in the tool area, activating a cursor function.

According to an embodiment of the invention, during the period of enabling the virtual touch function, the operation method further includes: determining whether a currently executed application program supports the tool function; activating the corresponding tool function if the application program supports the tool function and if the clicking operation is detected in the tool area; activating the cursor function if the application program does not support the tool function and if the clicking operation is detected in the tool area.

According to an embodiment of the invention, a sensing direction of the optical sensor is parallel to the base.

In view of the above, according to the posture of the cover and the angle of the cover relative to the base, steps in the operation method can be correspondingly switched in a spontaneous manner, so as to ensure that the user can use the portable electronic apparatus in a simple and intuitive manner. As to the air gesture function, the user is allowed to perform hand gesture above the display unit, and thus the issue of covering the displayed screen by hands does not arise.

Several exemplary embodiments accompanied with figures are described in detail below to further describe the disclosure in details.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
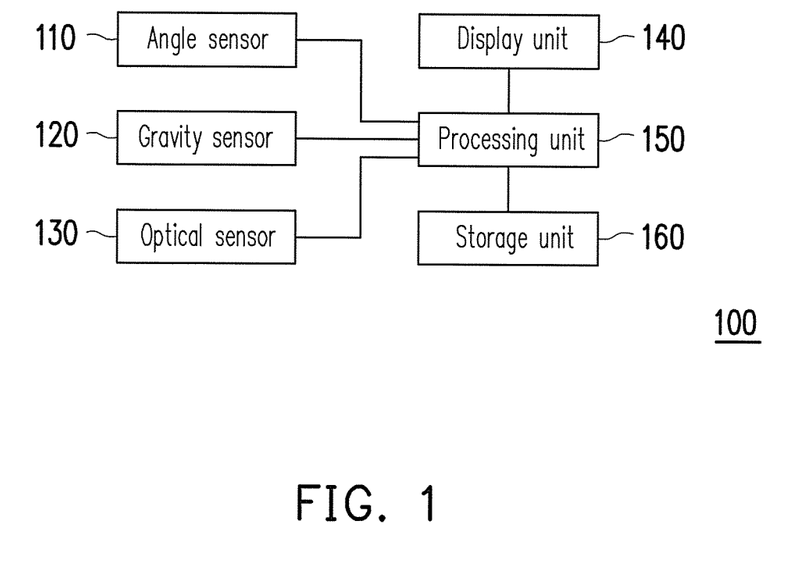
FIG. 1 is a schematic block view illustrating a portable electronic apparatus according to an embodiment of the invention.
Figure 2A:
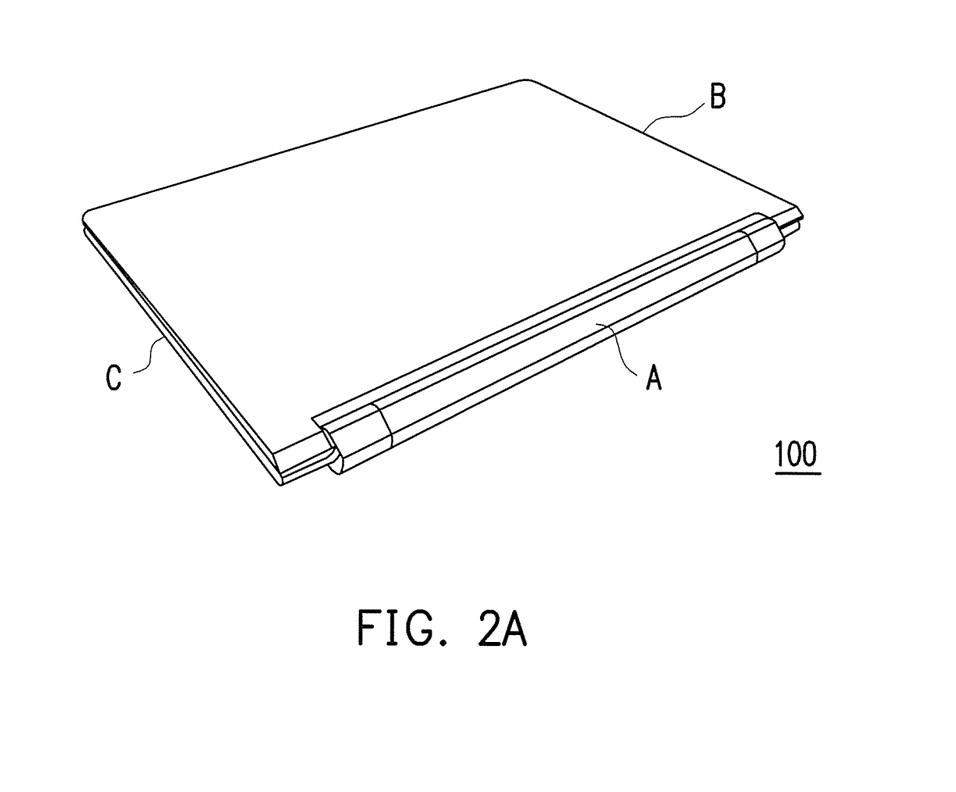
FIG. 2A-FIG. 2B are schematic views illustrating a portable electronic apparatus according to an embodiment of the invention.
Figure 2B:
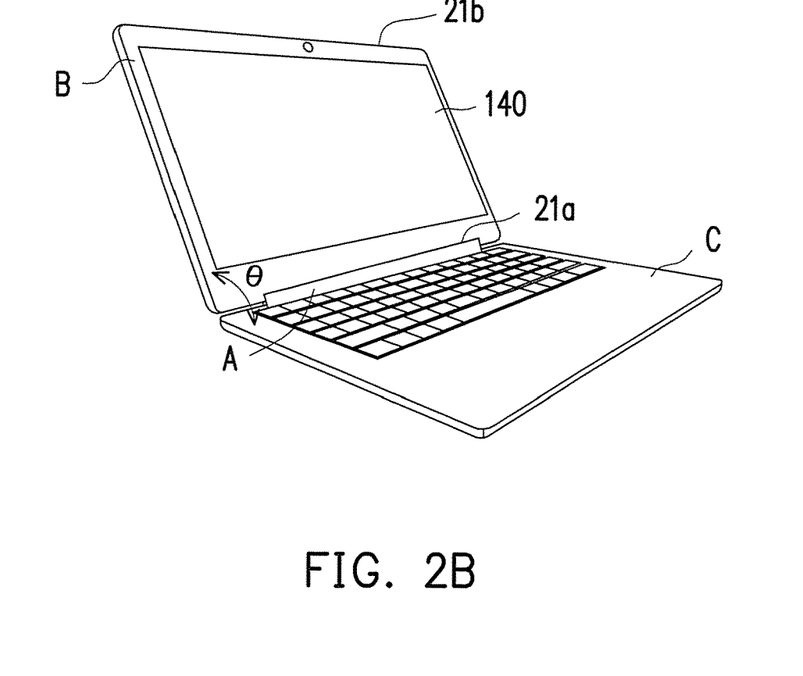

FIG. 1 is a schematic block view illustrating a portable electronic apparatus according to an embodiment of the invention. FIG. 2A-FIG. 2B are schematic views illustrating a portable electronic apparatus according to an embodiment of the invention. With reference to FIG. 1 and FIG. 2A to FIG. 2B, a portable electronic apparatus 100 includes a cover B, a base C, and a pivoting element A. The portable electronic apparatus 100 has an opening-and-closing structure. In FIG. 2A, the cover B and the base C of the portable electronic apparatus 100 are in a closed state; in FIG. 2B, the cover B and the base C of the portable electronic apparatus 100 are in an opened state.

The cover B is pivoted to the base C through the pivoting element A, such that the cover B and the base C can be relatively rotated through the pivoting element A. In the present embodiment, the rotation range of the cover B relative to the base C is 0°-360°. That is, an angle included between the base C and a surface of the cover B where the display unit 140 is located is 0°-360°.

Since the rotation range of the pivoting element A is 0°-360°, the posture of the cover B is an upright posture or an upside-down posture due to the rotation. When the posture of the cover B is the upright posture, a first side 21a of the cover B pivoted to the base C is located below a second side 21b of the cover B parallel to the first side 21a. When the posture of the cover B is the upside-down posture, the first side 21a of the cover B pivoted to the base C is located above the second side 21b of the cover B parallel to the first side 21a. In FIG. 2B, the posture of the cover B is the upright posture.

As shown in FIG. 1, the portable electronic apparatus 100 includes an angle sensor 110, a gravity sensor 120, an optical sensor 130, a display unit 140, a processing unit 150, and a storage unit 160. The processing unit 150 is coupled to the angle sensor 110, the gravity sensor 120, the optical sensor 130, the display unit 140, and the storage unit 160.

The display unit 140 is arranged on the cover B. The angle sensor 110 is arranged on the pivoting element A and configured to sense an angle θ of the cover B relative to the base C, i.e., the angle included between the base C and a surface of the cover B where the display unit 140 is located. The gravity sensor 120 is arranged on the cover B and configured to sense whether the posture of the cover B is the upright posture or the upside-down posture. The optical sensor 130 is arranged on the pivoting element A and configured to sense a motion trail of an external object (e.g., a hand) and further control contents displayed by the display unit 140 by using the external object. A sensing direction of the optical sensor 130 is parallel to the base C. Besides, the optical sensor 130 may be built in the portable electronic apparatus 100 or may be an external element connected to the portable electronic apparatus 100.

The locations of the angle sensor 110, the gravity sensor 120, and the optical sensor 130 are merely exemplary and should not be restrictive herein. Besides, the way to sense the angle θ of the cover B relative to the base C by using the angle sensor 110 and the way to sense the posture of the cover B by using the gravity sensor 120 are merely exemplary and should not be restrictive herein.

The processing unit 150 is, for instance, a central processing unit (CPU), a programmable microprocessor, an embedded control chip, a digital signal processor (DSP), an application specific integrated circuit (ASIC), or any other similar device. The display unit 140 is, for instance, a liquid crystal display, a plasma play, and so on.

The storage unit 160 is, for instance, an immobile or mobile random access memory (RAM) of any type, a read-only memory (ROM), a flash memory, a hard drive, any other similar device, or a combination thereof. Besides, the storage unit 160 stores a computer program product. The computer program product is constituted by a plurality of programming code snippets (i.e., programming code snippets for building an organization diagram, approving a list, settings, and configurations). After the programming code snippets are loaded to the portable electronic apparatus 100 and executed, the processing unit 150 can perform the operation method of the portable electronic apparatus 100 provided below.

Figure 3:
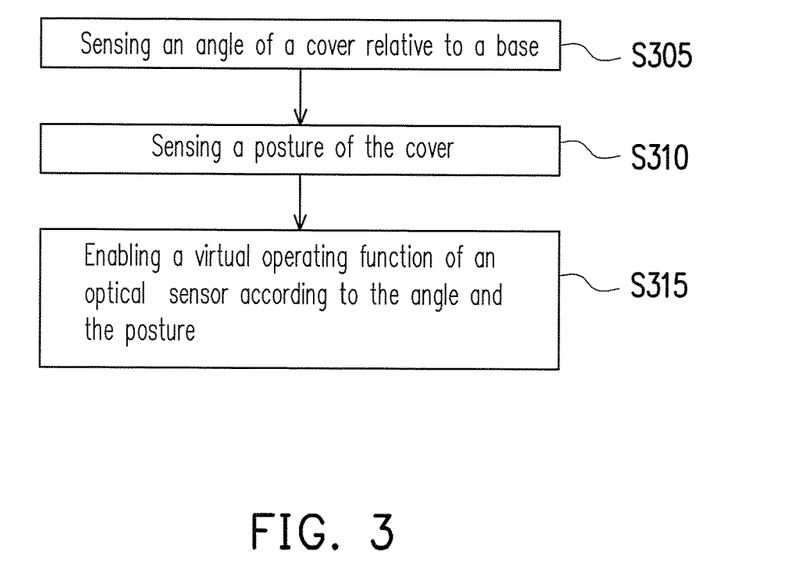
FIG. 3 is a flowchart illustrating an operation method of a portable electronic apparatus according to an embodiment of the invention.

FIG. 3 is a flowchart illustrating an operation method of a portable electronic apparatus according to an embodiment of the invention. In step S305, the angle sensor 110 is applied to sense the angle θ of the cover B relative to the base C. As shown in FIG. 2B, the angle θ is the angle included between the base C and a surface of the cover B where the display unit 140 is located.

In step S310, the gravity sensor 120 is applied to sense the posture of the cover B. In step S315, the processing unit 150 enables a virtual operating function of the corresponding optical sensor 130 based on the angle and the posture. For instance, the virtual operating function of the optical sensor 130 includes an air gesture function and a virtual touch function. The processing unit 150 determines whether to enable the air gesture function or the virtual touch function according to said angle and said posture.

Figure 4:
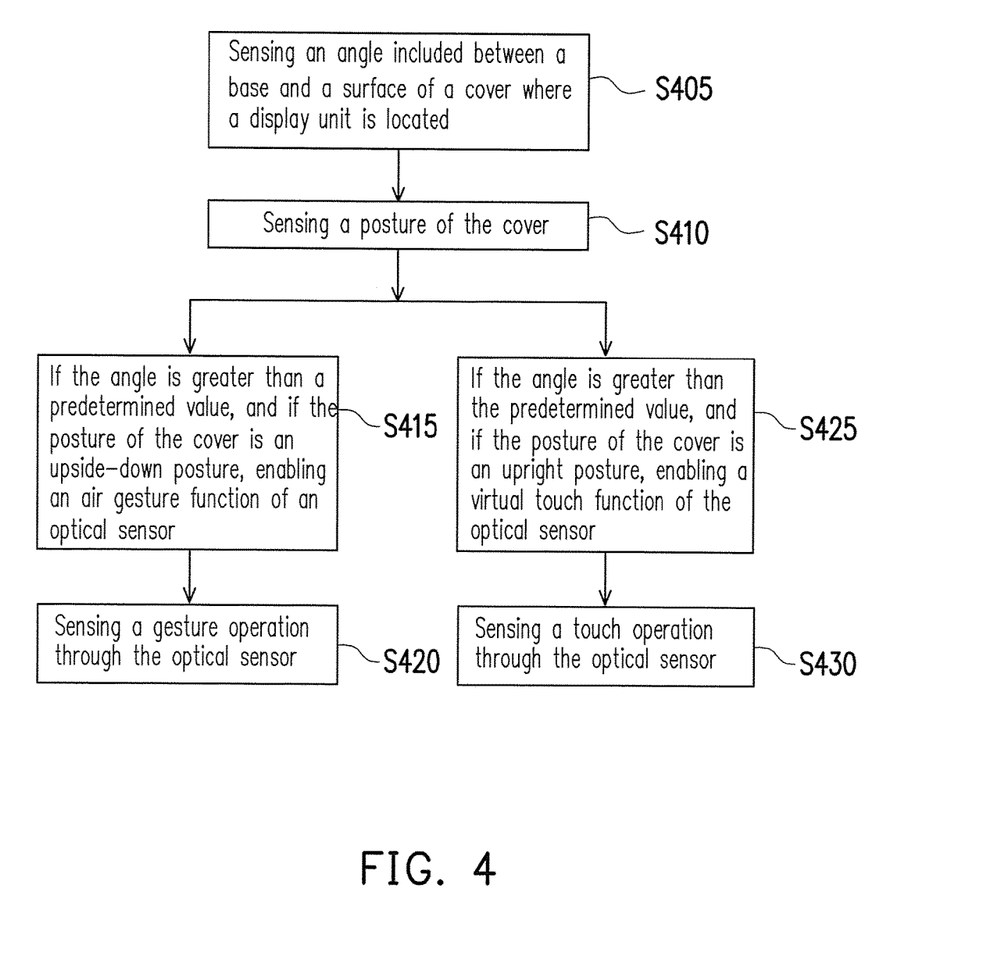
FIG. 4 is a flowchart illustrating an operation method of a portable electronic apparatus according to another embodiment of the invention.

FIG. 4 is a flowchart illustrating an operation method of a portable electronic apparatus according to another embodiment of the invention. The present embodiment provides an application example of the operation method as depicted in FIG. 3. With reference to FIG. 1, FIG. 2B, and FIG. 4, in step S405, the angle sensor 110 is applied to sense the angle θ included between the base C and a surface of the cover B where the display unit 140 is located. If the angle θ is greater than a predetermined value (e.g., 180°), for instance, the processing unit 150 enables the optical sensor 130. If the angle θ is less than or equal to the predetermined value, the processing unit 150 disables the optical sensor 130 to prevent unintentional operations.

In step S410, the gravity sensor 120 is applied to sense the posture of the cover B. For instance, whether the posture of the cover B is the upright posture or the upside-down posture is sensed. The order of steps S405 and S410 is not limited herein.

In step S415, if the angle θ is greater than the predetermined value, and if the posture of the cover B is the upside-down posture, the air gesture function of the optical sensor 130 is enabled. In step S420, during a period of enabling the air gesture function, the optical sensor 130 is applied to sense a gesture operation, so as to control contents displayed by the display unit 140.

For instance, if the angle θ is greater than 180°, and if the posture of the cover B is the upside-down posture, the portable electronic apparatus 100 is in a tent mode. In this case, the pivoting element A having the optical sensor 130 is located above the display unit 140; hence, the processing unit 150 enables the air gesture function of the optical sensor 130, such that the user is able to operate the portable electronic apparatus 100 above the display unit 140 without covering or blocking the display unit 140.

Besides, to use the portable electronic apparatus 100 in a more convenient manner, a virtual touch function can be further configured. If the angle θ is greater than the predetermined value, and if the posture of the cover B is the upright posture, the virtual touch function of the optical sensor 130 can be enabled. That is, in step S425, if the angle θ is greater than the predetermined value, and if the posture of the cover B is the upside-down posture, the virtual touch function of the optical sensor 130 is enabled. In step S430, during a period of enabling the virtual touch function, the optical sensor 130 is applied to sense a touch operation, so as to control the contents displayed by the display unit 140.

Figure 5A:
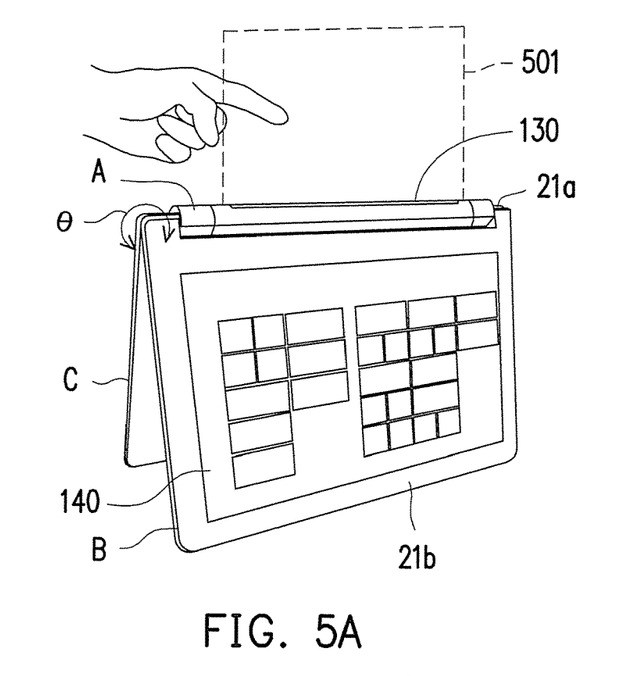
FIG. 5A is a schematic view of enabling an air gesture function of a portable electronic apparatus according to an embodiment of the invention.
Figure 5B:
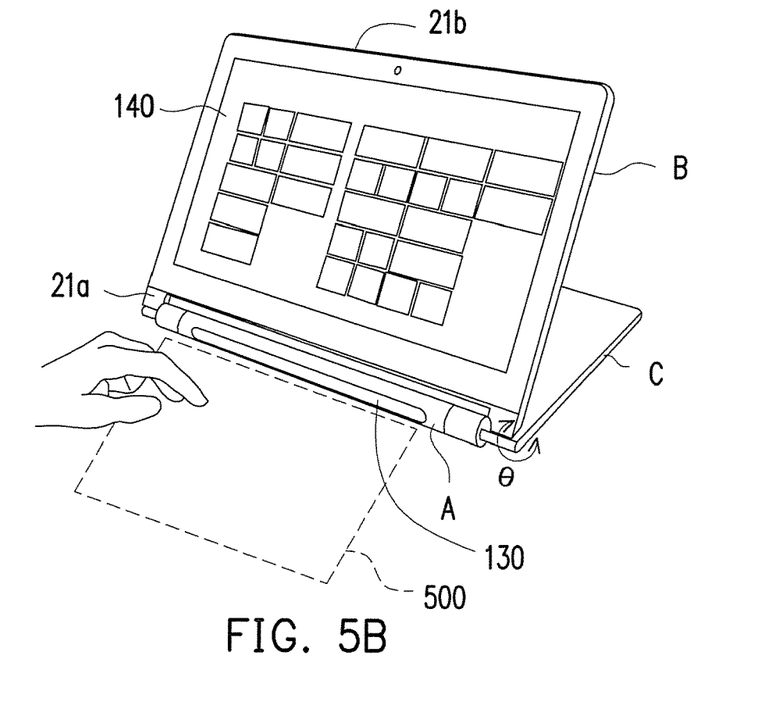
FIG. 5B is a schematic view of enabling a virtual touch function of a portable electronic apparatus according to an embodiment of the invention.

The air gesture function and the virtual touch function are exemplified below. FIG. 5A is a schematic view of enabling an air gesture function of a portable electronic apparatus according to an embodiment of the invention. FIG. 5B is a schematic view of enabling a virtual touch function of a portable electronic apparatus according to an embodiment of the invention. In FIG. 5A, the posture of the cover B is the upside-down posture, i.e., the first side 21a of the cover B pivoted to the base C is located above the second side 21b of the cover B parallel to the first side 21a. Besides, the angle θ included between the base C and a surface of the cover B where the display unit 140 is located is greater than 180°. In FIG. 5B, the posture of the cover B is the upright posture, i.e., the first side 21a of the cover B pivoted to the base C is located below the second side 21b of the cover B parallel to the first side 21a. Besides, the angle θ included between the base C and a surface of the cover B where the display unit 140 is located is greater than 180°. As shown in FIG. 5A, the portable electronic apparatus 100 is in the tent mode. In this case, the optical sensor 130 arranged on the pivoting element A is located above the display unit 140, and the sensing direction of the optical sensor 130 is parallel to the base C, such that the user is able to control the contents displayed by the display unit 140 above the display unit 140 through performing the gesture operation. For instance, a sensing range 501 is determined by the optical sensor 130, and the user can perform the gesture operation within the sensing range 501.

During the period of enabling the air gesture function, the processing unit 150 can further determine whether a currently executed application program supports a full screen mode. If the application program supports the full screen mode, the processing unit 150 displays the application program in the full screen mode.

Methods 1 to 3 are provided below to explain how to determine the gesture operation during the period of enabling the air gesture function. According to the methods 1 to 3, it is not necessary to detect whether the currently executed application program supports the gesture operation or not.

Method 1

The processing unit 150 detects a first amount of movement of the gesture operation along a horizontal axis (x-axis) and a second amount of movement of the gesture operation along a vertical axis (y-axis). The processing unit 150 then determines whether the first amount of movement is greater than the second amount of movement. If the first amount of movement is greater than the second amount of movement, the processing unit 150 performs a switching function of an application program based on a direction of movement of the gesture operation along the horizontal axis. The switching function is, for instance, a function of switching to the previous page or the next page, a fast-backward or fast-forward function, or a function of switching to the previous photo or the next photo. If the first amount of movement is less than or equal to the second amount of movement, the processing unit 150 determines whether to start or end a playing function of the application program based on a direction of movement of the gesture operation along the vertical axis.

Here, if the first amount of movement is less than or equal to the second amount of movement, the settings are described below: when the direction of movement of the gesture operation along the vertical axis is from top to bottom, if the playing function is being performed, the playing function is terminated, and if the playing function is not performed yet, the playing function is performed. When the direction of movement of the gesture operation along the vertical axis is from bottom to top, no function is performed. The settings in another embodiment may be different. For instance, if the direction of movement of the gesture operation along the vertical axis is from top to bottom, the playing function is performed; if the direction of movement of the gesture operation along the vertical axis is from bottom to top, the processing unit 150 stops performing the playing function.

The method 1 is applicable to application programs including presentation software, multi-media players, photo viewers, and other application programs that can be switched back and forth. The application programs and the corresponding gesture operations are provided in Table 1 below.

TABLE 1

| Application Program | Gesture Operation | | |
| --- | --- | --- | --- |
| | From right to left | From left to right | From top to bottom |
| Presentation software | Previous page | Next page | Start/end to play |

TABLE 1-continued

| Application Program | Gesture Operation | | |
| --- | --- | --- | --- |
| | From right to left | From left to right | From top to bottom |
| Multi-media player | Fast-backward | Fast-forward | Start/end to play |
| Photo viewer | Previous photo | Next photo | Start/end to play |

Method 2

According to the method 2, it is neither required to measure the second amount of movement along the vertical axis nor required to compare the first amount of movement with the second amount of movement, and thus the entire process can be simplified. Specifically, the processing unit 150 detects a first amount of movement of the gesture operation along a horizontal axis. The processing unit 150 then determines whether the first amount of movement is greater than a first threshold. If the first amount of movement is greater than the first threshold, the processing unit 150 performs a switching function of an application program based on a direction of movement of the gesture operation along the horizontal axis. If the first amount of movement is less than or equal to the first threshold, the processing unit 150 determines whether to start or end a playing function of the application program based on the direction of movement of the gesture operation along the vertical axis. Here, if the first amount of movement is less than or equal to the first threshold, the settings are described below: when the direction of movement of the gesture operation along the vertical axis is from top to bottom, if the playing function is being performed, the playing function is terminated; and if the playing function is not performed yet, the playing function is performed. When the direction of movement of the gesture operation along the vertical axis is from bottom to top, no function is performed.

The method 2 is also applicable to application programs including presentation software, multi-media players, photo viewers, and other application programs that can be switched back and forth. The application programs and the corresponding gesture operations are provided in Table 1 above.

Method 3

According to the method 3, it is not required to compare the first amount of movement with the second amount of movement, and thus the entire process can be simplified. Specifically, the processing unit 150 detects a first amount of movement of the gesture operation along a horizontal axis and a second amount of movement of the gesture operation along a vertical axis. The processing unit 150 then determines whether the second amount of movement is greater than a second threshold. If the second amount of movement is greater than the second threshold, the processing unit 150 performs a scrolling-up-and-browsing function or a scrolling-down-and-browsing function of an application program based on a direction of movement of the gesture operation along the vertical axis. If the second amount of movement is less than or equal to the second threshold, the processing unit 150 determines whether the first amount of movement is greater than the first threshold. If the first amount of movement is greater than the first threshold, the processing unit 150 starts or ends a playing function of the application program. Here, if the first amount of movement is greater than the first threshold, the settings are described below: if the playing function is being performed, the playing function is terminated; if the playing function is not performed yet, the playing function is performed. If the first amount of movement is less than or equal to the first threshold, no function is performed.

The method 3 is applicable to application programs including webpage browsers, PDF readers, and other application programs that can be switched up and down. The application programs and the corresponding gesture operations are provided in Table 2 below.

TABLE 2

| | Gesture operation | | |
|---|---|---|---|
| Application program | From top to bottom | From bottom to up | From left to right or from right to left |
| Webpage browser | scrolling-down-and-browsing | scrolling-up-and-browsing | Start/end to play |
| PDF reader | scrolling-down-and-browsing | scrolling-up-and-browsing | Start/end to play |

Please refer to FIG. 5B. In FIG. 5B, the posture of the portable electronic apparatus 100 is the upright posture, the optical sensor 130 arranged on the pivoting element A is located below the display unit 140, and the sensing direction of the optical sensor 130 is parallel to the base C, such that the optical sensor 130 can be applied to determine a sensing range 500 for simulating a touch panel function. The user can perform a touch operation or a hand-writing operation within the sensing range 500; alternatively, the touch operation can be performed by other objects. In addition, the sensing range 500 can be further divided. For instance, FIG. 6 is a schematic view illustrating a sensing range according to an embodiment of the invention.

Figure 6:
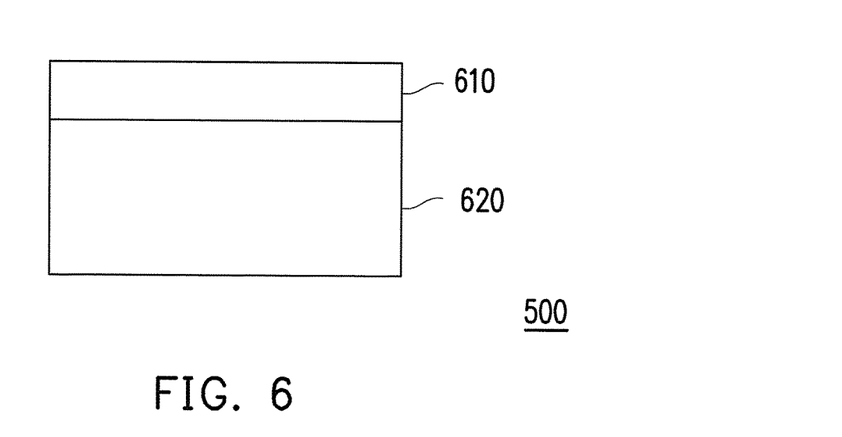
FIG. 6 is a schematic view illustrating a sensing range according to an embodiment of the invention.

With reference to FIG. 6, the sensing range 500 includes a tool area 610 and a touch panel area 620. The tool area 610 is close to the optical sensor 130 and can be configured to rapidly activate a certain function of the application program. For instance, if the user touches the tool area 610, a painting function is activated. The touch panel area 620 acts as a touch panel, i.e., the user is able to perform the function of the touch panel (hardware) within the touch panel area.

Besides, the tool area 610 can be further divided into a plurality of blocks, e.g., half in the left and half in the right. The blocks in the left of the tool area 610 correspond to the painting function, and the blocks in the right correspond to a hand-shaped tool.

During the period of enabling the virtual touch function, the processing unit 150 detects the number of touch points of the touch operation. If the number of the touch points is greater than or equal to 2, the processing unit 150 determines that the touch operation is a gesture operation of an operating system. For instance, the touch operation is considered as a gesture operation of a Windows operating system. If the number of the touch points is equal to 1, the processing unit 150 determines whether or not a clicking operation is detected in the tool area 610 within the sensing range 500. If the clicking operation is detected in the tool area 610, the processing unit 150 activates a corresponding tool function. If no clicking operation is detected in the tool area 610, the processing unit 150 activates a cursor function. That is, before the clicking action is detected in the tool area 610, the processing unit 150 considers the touch operation in the tool area 610 as the cursor movement.

Besides, when the clicking action is detected in the tool area 610, the processing unit 150 can further determine whether a currently executed application program supports the tool function. If the application program supports the tool function, and if the clicking action is detected in the tool area 610, the processing unit 150 activates the corresponding tool function. If the application program does not support the tool function, and if the clicking action is detected in the tool area, the processing unit 150 activates the cursor function. That is, the processing unit 150 considers the touch operation in the tool area 610 as the cursor movement.

In addition, during the period of enabling the virtual touch function, the settings are described below. If the number of the touch points is equal to 1, the processing unit 150 determines whether the currently executed application program supports the tool function. If the application program does not support the tool function, the processing unit 150 considers the touch operation (single-point touch) within the sensing range (including the tool area 610 and the touch panel area 620) as the cursor movement. If the application program supports the tool function, the processing unit 150 determines whether or not the clicking operation is detected in the tool area 610 within the sensing range 500.

Two application examples are further provided below to explain how to enable the air gesture function and the virtual touch function.

Figure 7:
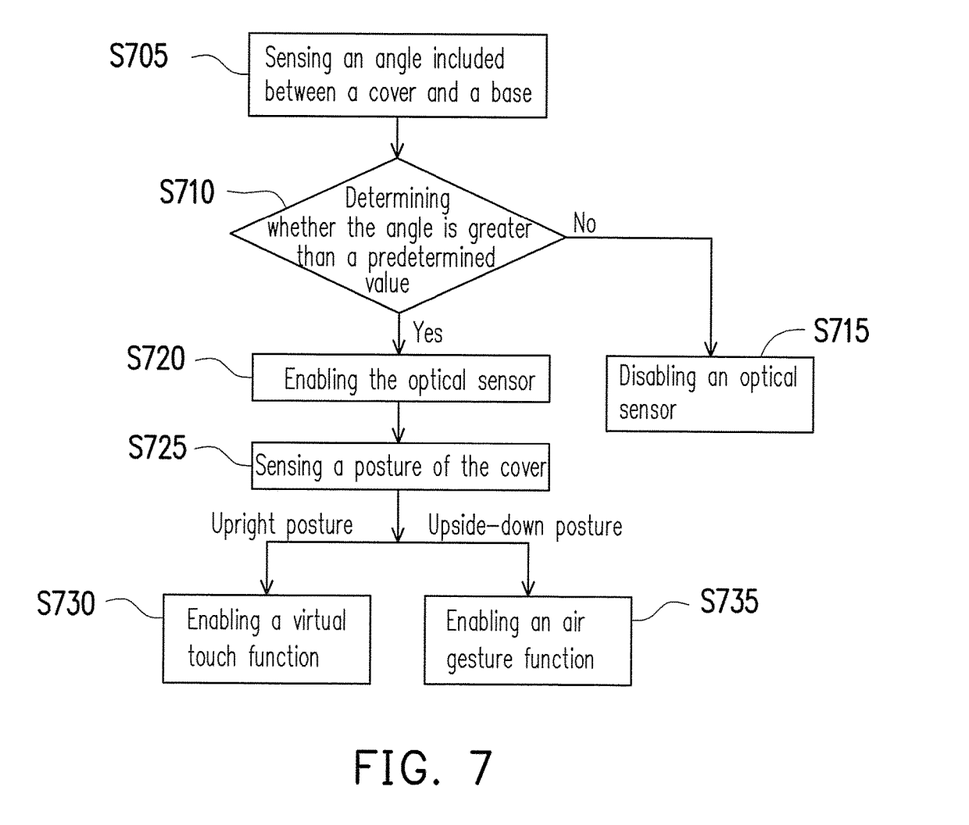
FIG. 7 is a flowchart illustrating an operation method of a portable electronic apparatus according to another embodiment of the invention.

FIG. 7 is a flowchart illustrating an operation method of a portable electronic apparatus according to another embodiment of the invention. The present embodiment provides an application example of the operation method as depicted in FIG. 3.

With reference to FIG. 1, FIG. 2B, and FIG. 7, in step S705, the angle sensor 110 is applied to sense the angle θ included between the base C and the cover B. In step S710, the processing unit 150 determines whether the angle θ is greater than a predetermined value. If the angle θ is less than or equal to the predetermined value, the processing unit 150 disables the optical sensor 130 in step S715. If the angle θ is greater than the predetermined value, the processing unit 150 enables the optical sensor 130 in step S720.

In step S725, the gravity sensor 120 is applied to sense the posture of the cover B. If the posture of the cover B is the upright posture, in step S730, the processing unit 150 enables a virtual touch function. If the posture of the cover B is the upside-down posture, in step S735, the processing unit 150 enables an air gesture function.

Figure 8:
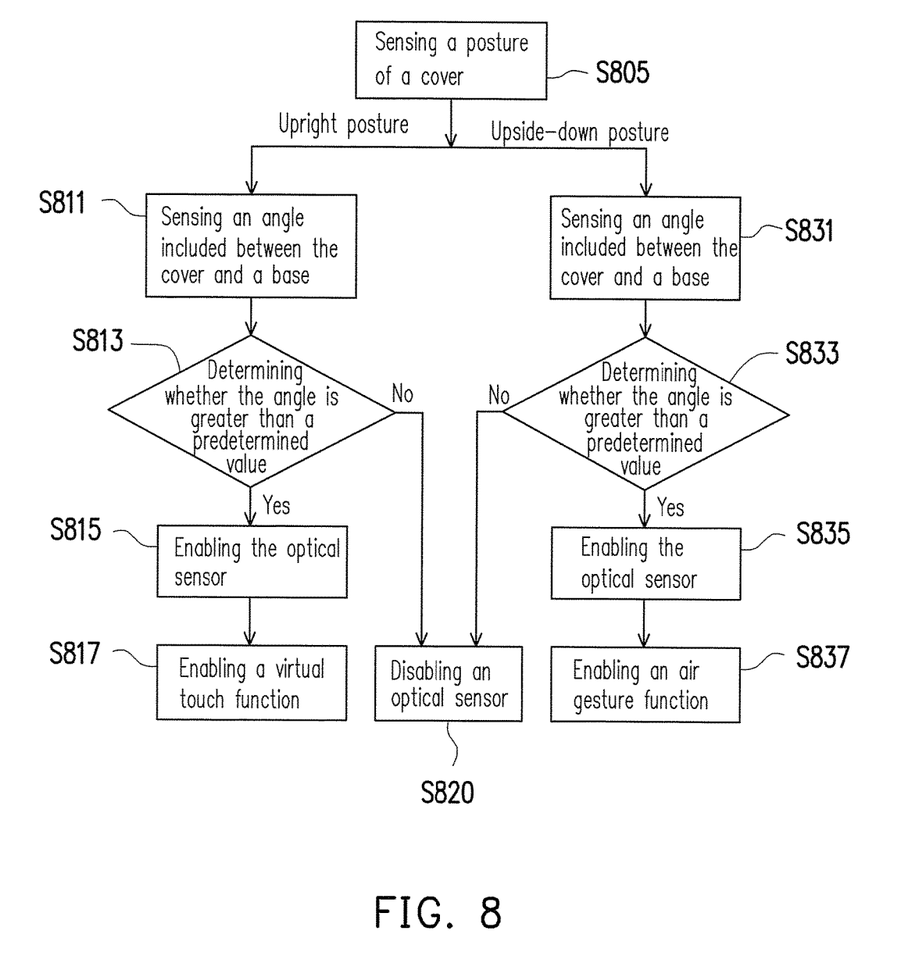
FIG. 8 is a flowchart illustrating an operation method of a portable electronic apparatus according to another embodiment of the invention.

FIG. 8 is a flowchart illustrating an operation method of a portable electronic apparatus according to another embodiment of the invention. The present embodiment provides an application example of the operation method as depicted in FIG. 3.

With reference to FIG. 1, FIG. 2B, and FIG. 8, in step S805, the gravity sensor 120 is applied to sense the posture of the cover B.

If the posture of the cover B is the upright posture, in step S811, the angle sensor 110 is applied to sense the angle θ included between the base C and the cover B. In step S813, the processing unit 150 determines whether the angle θ is greater than a predetermined value. If the angle θ is less than or equal to the predetermined value, the processing unit 150 disables the optical sensor 130 in step S820. If the angle θ is greater than the predetermined value, the processing unit 150 enables the optical sensor 130 in step S815. After that, in step S817, the processing unit 150 enables the virtual touch function.

By contrast, if in step S805 it is detected that the posture of the cover B is the upside-down posture, in step S831, the angle sensor 110 is applied to sense the angle θ included between the base C and the cover B. In step S833, the processing unit 150 determines whether the angle θ is greater than a predetermined value. If the angle θ is less than or equal to the predetermined value, the processing unit 150 disables the optical sensor 130 in step S820. If the angle θ is greater than the predetermined value, the processing unit 150 enables the optical sensor 130 in step S835. After that, in step S837, the processing unit 150 enables the air gesture function.

Figure 9:
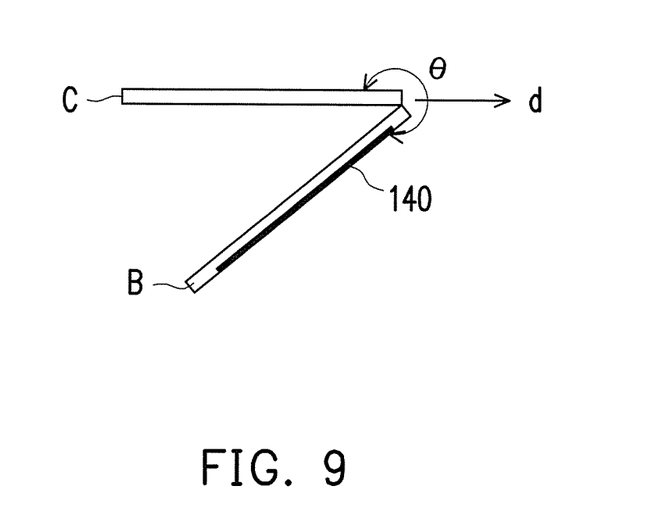
FIG. 9 is a schematic view of enabling another air gesture function of a portable electronic apparatus according to an embodiment of the invention.

FIG. 9 is a schematic view of enabling another air gesture function of a portable electronic apparatus according to an embodiment of the invention. According to FIG. 9, the angle θ included between the base C and the cover B is greater than 180°, and the posture of the cover B is the upside-down posture. Under said circumstances, the processing unit 150 enables the air gesture function as well, and the optical sensor 130 performs the sensing operation in its sensing direction d.

Figure 10A:
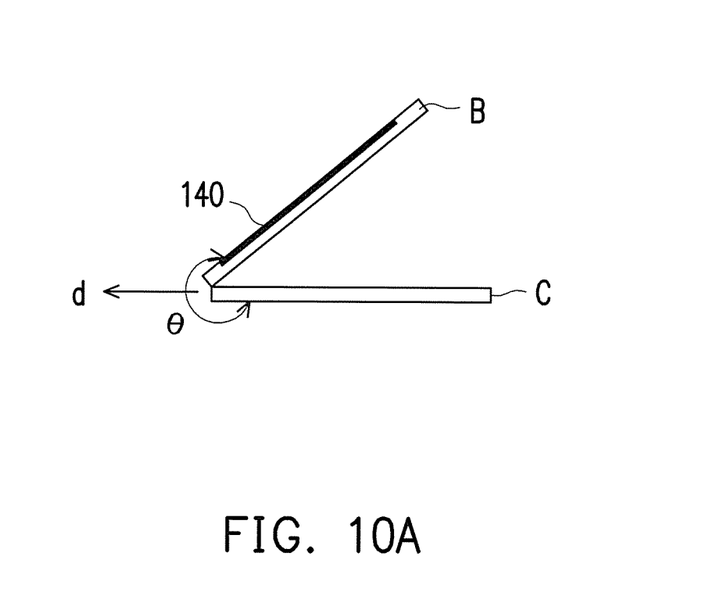
FIG. 10A-FIG. 10C are schematic views of enabling another virtual touch function of a portable electronic apparatus according to an embodiment of the invention.
Figure 10B:
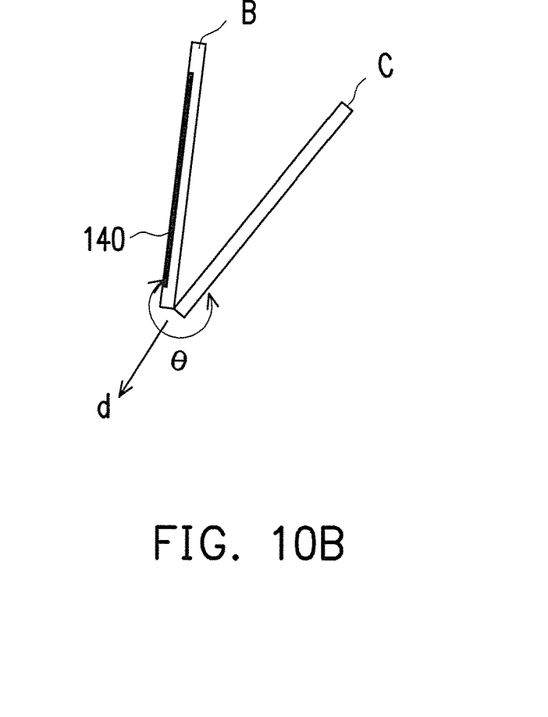
Figure 10C:
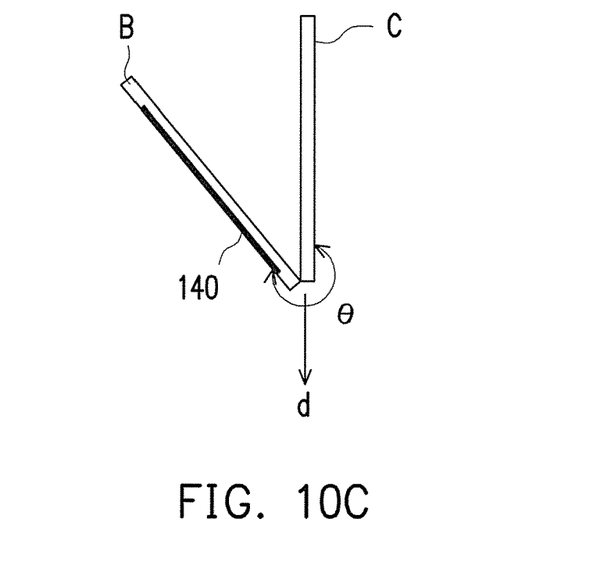

FIG. 10A-FIG. 10C are schematic views of enabling another virtual touch function of a portable electronic apparatus according to an embodiment of the invention. According to FIG. 10A to FIG. 10C, the angle θ included between the base C and the cover B is greater than 180°, and the posture of the cover B is the upright posture. Under said circumstances, the processing unit 150 enables the virtual touch function as well, and the optical sensor 130 performs the sensing operation in its sensing direction d.

To sum up, according to the posture of the cover (i.e., the upright posture or the upside-down posture) and the rotation angle of the cover relative to the base, steps in the operation method can be correspondingly switched in a spontaneous manner, so as to ensure that the user can use the portable apparatus in a simple and intuitive manner. If the user switches the portable electronic apparatus to the tent mode, the currently executed application program allows the full screen display and activates the optical sensor, such that the user can operate the portable electronic apparatus by performing the air gesture function. If the user places the portable electronic apparatus in an upright manner, the optical sensor can also be activated, such that the user can operate the portable electronic apparatus by performing the virtual touch function. As to the air gesture function, the user is allowed to perform hand gesture above the display unit, and thus the issue of covering the displayed screen by hands does not arise. Said embodiments can be applied to non-touch screens, such that the user can use the portable apparatus in a simple and intuitive manner in addition to using a keyboard or a mouse. Said embodiments are also applicable to touch screens, so as to reduce the dependence on the touch screens. Besides, thanks to the virtual touch function, the issue of shaking the screen caused by touching the screen in the upright mode can be prevented.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An operation method of a portable electronic apparatus, the portable electronic apparatus comprising a cover, a base, an angle sensor, a gravity sensor, and a pivoting element, the cover having a display unit and being pivoted to the base through the pivoting element, such that the cover and the base are rotated relatively, the operation method comprising:
sensing an angle of the cover relative to the base by the angle sensor;
sensing a posture of the cover by the gravity sensor; and
enabling a virtual operating function of an optical sensor based on the angle and the posture,
wherein the virtual operating function includes an air gesture function and a virtual touch function,
during a period of enabling the air gesture function, determining a first sensing range by the optical sensor and sensing a gesture operation within the first sensing range,
during a period of enabling the virtual touch function, determining a second sensing range by the optical sensor and sensing a touch operation within the second sensing range, wherein the first sensing range is different from the second sensing range,
wherein a sensing direction of the optical sensor is parallel to the base.

2. The operation method of claim 1, wherein the step of sensing the angle of the cover relative to the base comprises:
sensing the angle included between the base and a surface of the cover where the display unit is located.

3. The operation method of claim 2, wherein after the step of sensing the angle of the cover relative to the base, the operation method further comprises:
enabling the optical sensor if the angle is greater than a predetermined value; and
disabling the optical sensor if the angle is less than or equal to the predetermined value.

4. The operation method of claim 1, wherein if the posture of the cover is an upside-down posture, a first side of the cover pivoted to the base is located above a second side of the cover parallel to the first side, and
if the posture of the cover is an upright posture, said first side is located below said second side.

5. The operation method of claim 4, wherein the step of enabling the virtual operating function of the optical sensor based on the angle and the posture comprises:
if the angle is greater than a predetermined value, and if the posture of the cover is the upside-down posture, enabling the air gesture function of the optical sensor, wherein the optical sensor is arranged on the pivoting element; and
sensing the gesture operation through the optical sensor during the period of enabling the air gesture function, so as to control contents displayed by the display unit.

6. The operation method of claim 5, wherein the step of sensing the gesture operation through the optical sensor during the period of enabling the air gesture function to control the contents displayed by the display unit comprises:
detecting a first amount of movement of the gesture operation along a horizontal axis and a second amount of movement of the gesture operation along a vertical axis;
determining whether the first amount of movement is greater than the second amount of movement;
if the first amount of movement is greater than the second amount of movement, performing a switching function of an application program based on a direction of movement of the gesture operation along the horizontal axis; and
if the first amount of movement is less than or equal to the second amount of movement, determining whether to start or end a playing function of the application program based on a direction of movement of the gesture operation along the vertical axis.

7. The operation method of claim 5, wherein the step of sensing the gesture operation through the optical sensor during the period of enabling the air gesture function to control the contents displayed by the display unit comprises:
   detecting a first amount of movement of the gesture operation along a horizontal axis;
   determining whether the first amount of movement is greater than a first threshold;
   if the first amount of movement is greater than the first threshold, performing a switching function of an application program based on a direction of movement of the gesture operation along the horizontal axis; and
   if the first amount of movement is less than or equal to the first threshold, determining whether to start or end a playing function of the application program based on a direction of movement of the gesture operation along a vertical axis.

8. The operation method of claim 5, wherein the step of sensing the gesture operation through the optical sensor during the period of enabling the air gesture function to control the contents displayed by the display unit comprises:
   detecting a first amount of movement of the gesture operation along a horizontal axis and a second amount of movement of the gesture operation along a vertical axis;
   determining whether the second amount of movement is greater than a second threshold;
   if the second amount of movement is greater than the second threshold, performing a scrolling-up-and-browsing function or a scrolling-down-and-browsing function of an application program based on a direction of movement of the gesture operation along the vertical axis;
   if the second amount of movement is less than or equal to the second threshold, determining whether the first amount of movement is greater than a first threshold; and
   if the first amount of movement is greater than the first threshold, starting or ending a playing function of the application program.

9. The operation method of claim 5, wherein during the period of enabling the air gesture function, the method further comprises:
   determining whether a currently executed application program supports a full screen mode; and
   if the application program supports the full screen mode, displaying the application program in the full screen mode.

10. The operation method of claim 5, wherein the step of enabling the virtual operating function of the optical sensor based on the angle and the posture comprises:
    enabling the virtual touch function of the optical sensor if the angle is greater than a predetermined value and if the posture of the cover is an upright posture; and
    sensing the touch operation through the optical sensor during the period of enabling the virtual touch function, so as to control contents displayed by the portable electronic apparatus.

11. The operation method of claim 10, wherein the step of sensing the touch operation through the optical sensor during the period of enabling the virtual touch function to control the contents displayed by the portable electronic apparatus comprises:
    sensing the number of touch points in the touch operation;
    if the number of the touch points is greater than or equal to 2, determining the touch operation is a gesture operation of an operating system;
    if the number of the touch points is equal to 1, determining whether or not a clicking operation is detected in a tool area within a sensing range, wherein the sensing range further comprises a touch panel area;
    if the clicking operation is detected in the tool area, activating a corresponding tool function; and
    if no clicking operation is detected in the tool area, activating a cursor function.

12. The operation method of claim 11, during the period of enabling the virtual touch function, further comprising:
    determining whether a currently executed application program supports the tool function; and
    if the application program supports the tool function, and if the clicking operation is detected in the tool area, activating the corresponding tool function; and
    if the application program does not support the tool function, and if the clicking operation is detected in the tool area, activating the cursor function.

13. A portable electronic apparatus comprising:
    a pivoting element;
    a base;
    a cover comprising a display unit, the cover being pivoted to the base through the pivoting element, such that the cover and the base are rotated relatively;
    an angle sensor arranged on the pivoting element and configured to sense an angle of the cover relative to the base;
    a gravity sensor arranged on the cover and configured to sense a posture of the cover;
    an optical sensor arranged on the pivoting element; and
    a processing unit coupled to the angle sensor, the gravity sensor, the optical sensor, and the display unit, the processing unit enabling a virtual operating function of the optical sensor based on the angle and the posture,
    wherein the virtual operating function includes an air gesture function and a virtual touch function,
    during a period of enabling the air gesture function, determining a first sensing range by the optical sensor and sensing a gesture operation within the first sensing range,
    during a period of enabling the virtual touch function, determining a second sensing range by the optical sensor and sensing a touch operation within the second sensing range, wherein the first sensing range is different from the second sensing range,
    wherein a sensing direction of the optical sensor is parallel to the base.

14. The portable electronic apparatus of claim 13, wherein the angle sensor senses an angle included between the cover and the base;
    if the angle is greater than a predetermined value, the processing unit enables the optical sensor; if the angle is less than or equal to the predetermined value, the processing unit disables the optical sensor.

15. The portable electronic apparatus of claim 13, wherein if the posture of the cover is an upside-down posture, a first side of the cover pivoted to the base is located above a second side of the cover parallel to the first side, and if the posture of the cover is an upright posture, said first side is located below said second side;
    if the angle is greater than a predetermined value, and if the posture of the cover is the upside-down posture, the processing unit enables the air gesture function of the optical sensor, and during the period of enabling the air gesture function, the optical sensor senses the gesture operation, so as to control contents displayed by the display unit; and if the angle is greater than the predetermined value, and if the posture of the cover is the upright posture, the processing unit enables the virtual touch function of the optical sensor, and during the period of enabling the virtual touch function, the optical sensor senses the touch operation, so as to control contents displayed by the portable electronic apparatus.

16. The portable electronic apparatus of claim 15, wherein the optical sensor detects a first amount of movement of the gesture operation along a horizontal axis and a second amount of movement of the gesture operation along a vertical axis during the period of enabling the air gesture function; and the processing unit determines whether the first amount of movement is greater than the second amount of movement; if the first amount of movement is greater than the second amount of movement, the processing unit performs a switching function of an application program based on a direction of movement of the gesture operation along the horizontal axis; if the first amount of movement is less than or equal to the second amount of movement, the processing unit determines whether to start or end a playing function of the application program based on a direction of movement of the gesture operation along the vertical axis.

17. The portable electronic apparatus of claim 15, wherein the optical sensor detects a first amount of movement of the gesture operation along a horizontal axis during the period of enabling the air gesture function; and the processing unit determines whether the first amount of movement is greater than a first threshold; if the first amount of movement is greater than the first threshold, the processing unit performs a switching function of an application program based on a direction of movement of the gesture operation along the horizontal axis; if the first amount of movement is less than or equal to the first threshold, the processing unit determines whether to start or end a playing function of the application program based on the direction of movement of the gesture operation along a vertical axis.

18. The portable electronic apparatus of claim 15, wherein the optical sensor detects a first amount of movement of the gesture operation along a first horizontal axis and a second amount of movement of the gesture operation along a vertical axis during the period of enabling the air gesture function; and the processing unit determines whether the second amount of movement is greater than a second threshold; if the second amount of movement is greater than the second threshold, the processing unit performs a scrolling-up-and-browsing function or a scrolling-down-and-browsing function of an application program based on a direction of movement of the gesture operation along the vertical axis; if the second amount of movement is less than or equal to the second threshold, the processing unit determines whether the first amount of movement is greater than a first threshold; if the first amount of movement is greater than the first threshold, the processing unit starts or ends a playing function of the application program.

19. The portable electronic apparatus of claim 15, wherein during the period of enabling the air gesture function, the processing unit determines whether a currently executed application program supports a full screen mode, and if the application program supports the full screen mode, the processing unit displays the application program in the full screen mode.

20. The portable electronic apparatus of claim 15, wherein the optical sensor detects the number of touch points of the touch operation during the period of enabling the virtual touch function; and if the number of the touch points is greater than or equal to 2, the processing unit determines that the touch operation is a gesture operation of an operating system;

if the number of the touch points is equal to 1, the processing unit determines whether or not a clicking operation is detected in a tool area within a sensing range, wherein the sensing range further comprises a touch panel area; if the clicking operation is detected in the tool area, the processing unit activates a corresponding tool function; if no clicking operation is detected in the tool area, the processing unit activates a cursor function.

21. The portable electronic apparatus of claim 20, wherein during the period of enabling the virtual touch function, the processing unit determines whether a currently executed application program supports the tool function, if the application program supports the tool function, and if the clicking operation is detected in the tool area, the processing unit activates the corresponding tool function; if the application program does not support the tool function, and if the clicking operation is detected in the tool area, the processing unit activates the cursor function.

* * * * *